(12) United States Patent
Baig et al.

(10) Patent No.: US 11,054,269 B2
(45) Date of Patent: Jul. 6, 2021

(54) PROVIDING NAVIGATION DIRECTIONS (71) Applicant: GOOGLE LLC, Mountain View, CA (US)

(72) Inventors: Haroon Baig, Mountain View, CA (US); Petr Pajas, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 16/078,408

(22) PCT Filed: Aug. 4, 2017

(86) PCT No.: PCT/US2017/045467
§ 371 (c)(1),
(2) Date: Aug. 21, 2018

(87) PCT Pub. No.: WO2019/027469
PCT Pub. Date: Feb. 7, 2019

(65) Prior Publication Data
US 2021/0048305 A1 Feb. 18, 2021

(51) Int. Cl.
G01C 21/36 (2006.01)
G06F 3/0484 (2013.01)
G06F 3/0488 (2013.01)

(52) U.S. Cl.
CPC ....... *G01C 21/3614* (2013.01); *G01C 21/367* (2013.01); *G01C 21/3617* (2013.01);
(Continued)

(58) Field of Classification Search
CPC ............ G01C 21/3614; G01C 21/3664; G01C 21/3694; G01C 21/367; G01C 21/3617;
(Continued)

(56) References Cited

U.S. PATENT DOCUMENTS

2012/0030634 A1* 2/2012 Miyazaki ............ G06F 3/04883 715/863
2012/0197696 A1* 8/2012 Beyeler ................ G09B 29/106 705/14.4

(Continued)

FOREIGN PATENT DOCUMENTS

EP 3 101 392 A1 12/2016
JP 2004-53304 A 2/2004

OTHER PUBLICATIONS

International Search Report and Written Opinion for Application No. PCT/US2017/045467, dated Apr. 9, 2018.
(Continued)

*Primary Examiner* — Rami Khatib
*Assistant Examiner* — Gabriel J Lambert
(74) *Attorney, Agent, or Firm* — Marshall, Gerstein & Borun LLP (57) ABSTRACT An interactive digital map of a geographic area is provided via a user interface of a user device, with the currently visible portion of the interactive digital map visible within a viewport. The viewport is repositioned from an initial position on the digital map to a target position on the digital map along a trajectory in accordance with one or more user commands. For different positions on the trajectory of the viewport, navigation directions to a geographic location near a center of the viewport are automatically retrieved, without receiving commands via the user interface to obtain navigation directions to the geographic location. The navigation directions having a first and second levels of detail are retrieved for a first and second points on the trajectory, respectively, the first level of detail including less information than the second level of detail. The navigation directions are displayed via the user interface.

20 Claims, 8 Drawing Sheets (52) U.S. Cl.
CPC ..... *G01C 21/3647* (2013.01); *G01C 21/3664* (2013.01); *G01C 21/3694* (2013.01); *G06F 3/04845* (2013.01); *G06F 3/04883* (2013.01)

(58) Field of Classification Search
CPC ............. G01C 21/3647; G06F 3/04845; G06F 3/04883
See application file for complete search history.

(56) References Cited

U.S. PATENT DOCUMENTS

| | | | | |
|---|---|---|---|---|
| 2012/0208559 | A1* | 8/2012 | Svendsen | G01C 21/3611 455/456.2 |
| 2012/0249456 | A1* | 10/2012 | Taka | G01C 21/367 345/173 |
| 2012/0265433 | A1* | 10/2012 | Viola | G01C 21/362 701/410 |
| 2013/0138500 | A1* | 5/2013 | Charaniya | G06Q 30/02 705/14.43 |
| 2013/0257742 | A1* | 10/2013 | Jones | G09G 5/34 345/173 |
| 2014/0340304 | A1* | 11/2014 | Dewan | G09G 5/34 345/156 |
| 2014/0359510 | A1* | 12/2014 | Graf | G01C 21/3614 715/771 |
| 2014/0365126 | A1* | 12/2014 | Vulcano | G01C 21/362 701/533 |
| 2015/0241225 | A1* | 8/2015 | Liu | G01C 21/3667 701/540 |
| 2016/0154538 | A1* | 6/2016 | Wang | G06F 3/0488 715/771 |
| 2017/0068413 | A1* | 3/2017 | Jansky | G06F 3/0488 |

OTHER PUBLICATIONS

Decision of Rejection for Japanese Application No. 2018-545434, dated May 18, 2020.
First Examination Report for India Application No. 201847032523, dated Oct. 30, 2020.
Notice of Reasons for Rejection for Japanese Application No. 2018-545434, dated Sep. 24, 2019.

* cited by examiner

PROVIDING NAVIGATION DIRECTIONS

FIELD OF TECHNOLOGY

This disclosure relates to interactive geographic applications and, more particularly, to providing navigation directions to a user without an explicit request for navigation directions from the user.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A variety of computing devices support geographic software applications for displaying interactive digital maps of geographic areas. A geographic application typically provides directional, rotational, and zoom controls for positioning a window defining a viewable portion of the digital map, which can be referred to as to as "viewport," over the desired location. For example, these controls can be provided in the form of buttons overlaying the digital map. As another example, a geographic application operating in a device equipped with a touchscreen can support user gestures, so that the user can pan across the digital map by swiping her finger in the desired direction, zoom in on an area by pinching two fingers together, zoom out on an area by spreading two fingers apart, etc.

When geographic applications also provide navigation directions via a user interface, these applications generally require that the user specify the "from" (origin) and "to" (destination) locations, or at least the destination when the origin is assumed to correspond to the current location of the computing device. The user typically provides a street address, a street intersection, the name of a landmark, etc. by typing or speaking. When the user does not know the address or remembers only the general location, she can position the map viewport, defining the current visible portion of an interactive digital map, over the general area and attempts to select a point on the map as the destination by clicking or tapping on the touchscreen, for example.

The number of user operations required to specify the destination can be advantageously reduced by automatically determining the destination based on signals other than explicit user input. A geographic application can select the center of the viewport as the destination, automatically obtain navigation directions to this destination, and provide the navigation directions via the user interface, for example. However, this approach involves multiple technical challenges related to managing memory in the computing device, efficiently utilizing network link bandwidth when a network server provides navigation directions via a communication network, reducing latency when the user repositions the viewport, accurately identifying the destination at the center of the viewport, etc. As one example, transmitting new requests for navigation directions for every detected change in the position in the viewport can produce a large number of requests and responses resulting in a large amount of data transmitted over the network and/or transferred between memory regions of the computing device. As another example, when the user repositions the viewport quickly using the fling gesture, responses to requests for navigation directions may not arrive from the network server quickly enough, thereby resulting in display latency. These challenges may be particularly difficult in the case of a portable device that communicates with a remote network server over a wireless communications network, as every new request for navigation directions must be transmitted from the device to the remote network server, and every response must be transmitted from the network server to the device.

SUMMARY

A geographic application of this disclosure automatically provides navigation directions to a user in a manner that preserves network bandwidth and/or processing power, as well as reduces latency, e.g., the time delay between the determination of what geographic area is to be displayed within the viewport and the complete rendering of navigation directions in the viewport.

One embodiment of these techniques is a computer-implemented method for providing navigation directions. The method comprises providing an interactive digital map of a geographic area via a user interface of a user device, including displaying a currently visible portion of the interactive digital map within a viewport, and repositioning the viewport from an initial position on the digital map to a target position on the digital map along a trajectory in accordance with one or more user commands. For different positions on the trajectory of the viewport, the method automatically retrieves navigation directions to a geographic location near a center of the viewport without receiving commands via the user interface to obtain navigation directions to the geographic location. Automatically retrieving navigation directions includes retrieving navigation directions having a first level of detail for a first point on the trajectory and retrieving navigation directions having a second level of detail for a second point on the trajectory, the first level of detail including less information than the second level of detail. The method also includes displaying the navigation directions via the user interface.

Another embodiment of these techniques is a computing device that has a user interface configured to display content and receiver user input, one or more processors coupled to the user interface, and a non-transitory computer-readable medium storing instructions. When executed on the one or more processors, the instructions cause the computing device to provide an interactive digital map of a geographic area via the user interface, with the currently visible portion of the interactive digital map being displayed within a viewport. The instructions further cause the computing device to reposition the viewport from an initial position on the digital map to a target position on the digital map along a trajectory in accordance with one or more user commands received via the user interface and, for different positions on the trajectory of the viewport, automatically retrieve navigation directions to a geographic location near a center of the viewport without receiving commands via the user interface to obtain navigation directions to the geographic location. The retrieved navigation directions include first navigation directions at a first level of detail for a first point on the trajectory and second navigation directions at a second level of detail for a second point on the trajectory. The instructions further cause the computing device to display the navigation directions via the user interface.

Another embodiment of these techniques is a non-transitory computer-readable medium that stores instructions implementing a method for retrieving and displaying navigation directions. The instructions, when executed on one or more processors, cause the one or more processors to provide an interactive digital map of a geographic area via a user interface of a client device and display a currently visible portion of the interactive digital map within a viewport. The instructions further cause the one or more processors to reposition the viewport from an initial position on the digital map to a target position on the digital map along a trajectory in accordance with one or more user commands received via the user interface and, for multiple different positions on the trajectory of the viewport, automatically retrieve navigation directions to a geographic location near a center of the viewport without receiving commands via the user interface to obtain navigation directions to the geographic location. The step of automatically retrieve navigation directions includes retrieving navigation directions having a first level of detail for a first point on the trajectory, retrieving navigation directions having a second level of detail for a second point on the trajectory, the first level of detail including less information than the second level of detail, and displaying the navigation directions via the user interface.

DETAILED DESCRIPTION OF THE DRAWINGS

Overview

The geographic application of this disclosure advantageously reduces the number of user operations required to specify the destination by automatically determining the destination based on signals other than explicit user input, using an efficient and accurate techniques that result in little latency. These techniques can be implemented in a computing device having a user interface via which the geographic application can display an interactive digital map. The geographic application automatically determines a location within the geographic area represented by the currently visible portion of the digital map, obtains navigation directions to this location (from a remote server or using cached data), and provides a visualization of these navigation directions via the user interface, without the user explicitly specifying the location. In some implementations, the geographic application obtains navigation directions to this location from the current position of the computing device, so that the user also need not explicitly specify the origin. The automatically determined destination location in various implementations or scenarios can correspond to the geometric center of the viewport, a point of interest at or near the geometric center of the viewport selected in view of the mode of transport the user is likely to select (e.g., a subway station, a bus stop), a point of interest at or near the geometric center of the viewport selected in view of user preferences or interests (e.g., a coffee shop), etc. The geographic application can select the current location of the computing device, the user's home or work address, or some user-specific location as the origin for navigation directions.

To efficiently utilize network bandwidth, the geographic application may determine a new destination and requests new navigation directions only if the viewport has been displaced by more than a threshold distance or travel time, in some implementations. For example, when the user slowly pans the viewport, the geographic application may send a new request for directions after determining that center of the viewport has moved more than distance $d_{min}$ relative to the center at the previous position of the viewport. Distance $d_{min}$, as well as other distances the geographic application calculates in various scenarios, can be measured relative to the ground (i.e., real-world geography represented on the digital map) or the screen. Distance $d_{min}$ can be specific to the zoom level at which the software application currently displays the digital map. Distance $d_{min}$ also can be dependent on the size of the viewport, so that when the viewport moves between two locations for which navigation directions have been retrieved, at least one such location is within the viewport, to avoid the situation where navigation directions completely disappear from the viewport. The geographic application in some implementations automatically adjusts the distance $d_{min}$ (or some other threshold value defining the frequency of automatically requesting navigation directions) in view of the latency currently being observed. In this manner, the geographic application reduces the number of requests for navigation directions, thereby reducing bandwidth usage and processing time.

Further, the geographic application can request navigation directions at different levels of detail depending on the speed at which the viewport is moving. For example, the server can provide "lightweight" navigation directions (e.g., a polyline describing the path) in some cases and more detailed directions (e.g., turn-by-turn instructions, lane information, real-time traffic data, street-level panoramic imagery, ridesharing information) in other cases. The server can provide lightweight directions (requiring less data transmission) when the viewport is moving relatively quickly, and detailed directions when the viewport is at rest or is moving relatively slowly, as measured relative to one or several threshold values, for example.

As another example the software application may request navigation directions having a first level of detail for an intermediate point on the trajectory and request navigation directions having a second level of detail for a point at or near an endpoint of the trajectory, the first level of detail including less information than the second level of detail. In an example implementation, the geographic application analyzes the direction and the momentum the user communicated to the viewport with a fling gesture, determines the trajectory of the viewport (by assuming no intervening gestures) and determines the endpoint of the trajectory along with one or more intermediate locations along the trajectory, or waypoints. The geographic application requests navigation directions to the endpoint as well as to the waypoints upon calculating the expected trajectory and before the viewport reaches these locations, so that the presentation of these navigation directions appears seamless on the user interface. Further, the geographic application can request detailed directions to the endpoint of the trajectory and lightweight directions to the waypoints on the trajectory.

Depending on the implementation, the geographic application can select the waypoints that are evenly spread along the trajectory or correspond to landmarks that are not necessarily spread evenly along the trajectory. For example, the geographic application can determine weights for points-of-interest (POIs) along the trajectory in view of user reviews, user-specific preferences, historical data, etc. and/or visual prominence of the POIs and select waypoints in view of the weights as well as in view of distances to other waypoints.

The geographic application can determine the mode of transport based on any suitable combination of signals as the distance from the origin to the new destination, last mode of transport used by the user, user's preferences, traffic, projected cost, accessibility by types of transport, time of day, etc. For example, the geographic application can automatically request walking directions to the center of the viewport in its initial position and request driving directions to the center of the viewport in its new position, after the user displaces the viewport by more than N miles.

Further, the geographic application can generate multi-modal navigation directions in which different legs of the trip correspond to different modes of transport. For example, the geographic application can retrieve navigation directions that include driving directions a parking lot followed by walking directions from the parking lot to the destination reachable on foot.

As is evident from at least the above examples, the systems and methods of this disclosure provide advantages over the existing techniques by eliminating the need to manually specify the destination for navigation instructions and, moreover, by reducing the bandwidth usage, latency, and memory requirements when retrieving navigation instructions in various scenarios.

Example User Device and Communication System

Figure 1:
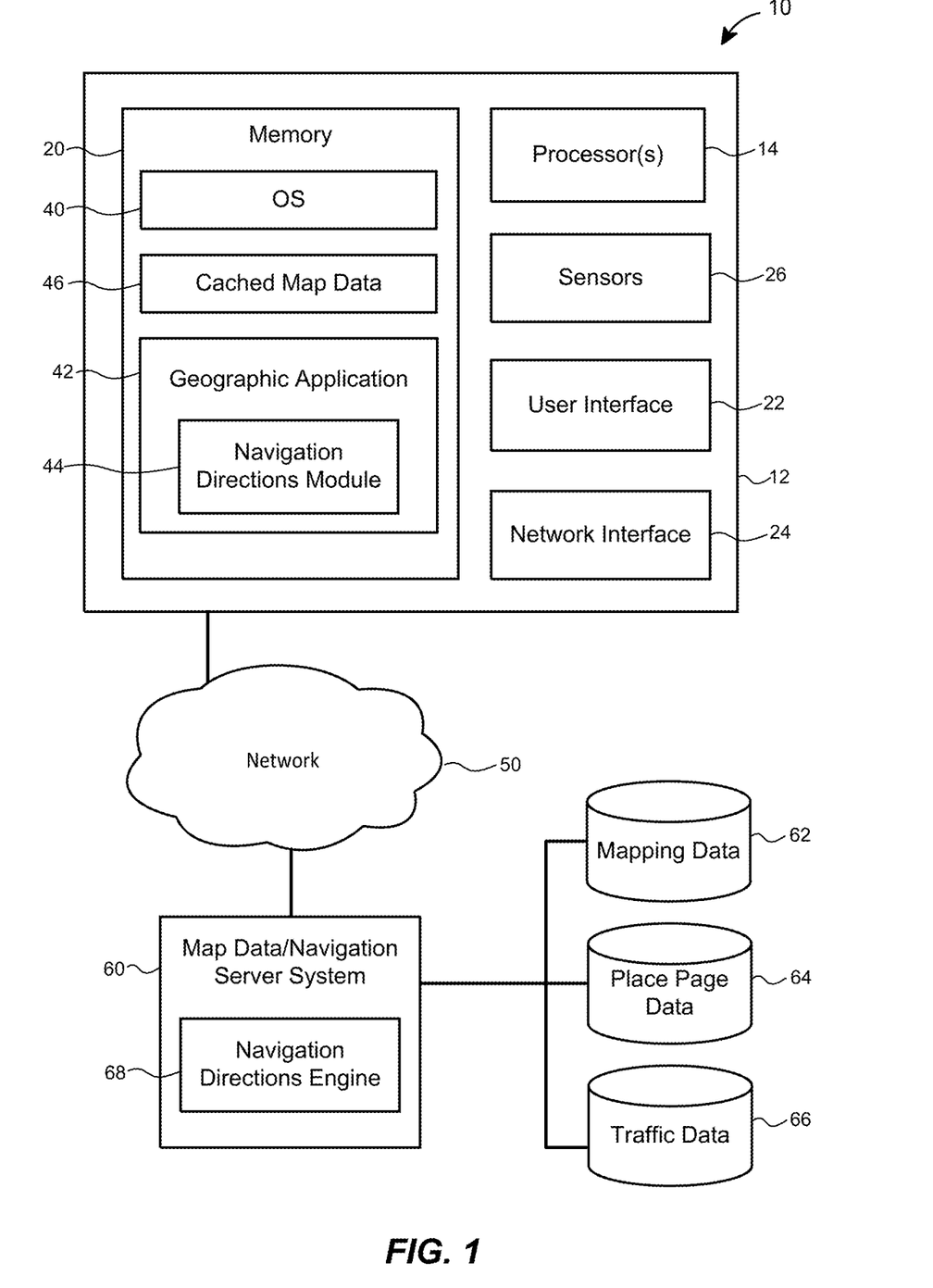
FIG. 1 is a block diagram of an example system in which the techniques of this disclosure for efficiently and accurately obtaining navigation directions can be implemented.

An example system 10 in which these techniques can be implemented in illustrated in FIG. 1. The system includes a user device 12, which can be a portable device such as a smartphone, a tablet computer, a smart watch, or a non-portable device such as a desktop computer, or a special-purpose computing device such as a navigator, for example. The user device 12 can include one or more processors 14, such as one or several central processing units (CPUs) and or several graphics processing units (GPUs), a computer-readable memory 20 which can include persistent (e.g., flash disk) and/or non-persistent (e.g., random access memory (RAM)) components, a user interface 22 which can include, for example, a touchscreen or a display device along with an input device, a network interface 24 for transmitting and receiving data via wired and/or wireless communication links, and one or more sensors 26 which can include a positioning unit such as a Global Positioning Service (GPS) module, an accelerometer, a gyroscope, etc.

The memory 20 can store instructions, executable on the one or more processors 14, that implement an operating system 40 and various software applications such as a geographic application 42. The geographic application 42 can be a special-purpose software application dedicated to generating geographic content such as interactive digital maps, navigation directions, results of geographic queries, etc., or, in another implementation, a general-purpose browser application executing a script and/or application programming interface (API) functions for generating geographic content. The geographic application 42 can operate on map data stored locally in the memory 20, such as cached map data 46, or receive geographic content from an online geographic service. The geographic application 42 can include a navigation directions module 44 configured to retrieve navigation directions in response to user input as well as automatically, as discussed in more detail below.

With continued reference to FIG. 1, the communication network 50 can be the Internet or any other suitable network that includes wired and/or wireless communication links. The user device 12 in general can communicate with any number of servers and databases to receive various geographic content such as map data, navigation directions, responses to geographic queries, etc. For simplicity, FIG. 1 illustrates only the map data/navigation server system 60 (for simplicity, "server 60") coupled to a map database 62, a place page database 64, and real-time traffic database 66.

The map database 62 can store map data describing various natural geographic features (e.g., rivers, mountains, forests) as well as artificial geographic features (e.g., roads, buildings, parks), etc. The map data can include descriptions of map features in a vector graphics format as sets of interconnected vertices and/or bitmap images, for example. The server 60 can provide map data for generating a map image for a certain geographic region and provide the map data to the client device 12, in any suitable format including vector-based format and raster format. The place page database 64 can include descriptions of geolocated businesses, hours of operation, user feedback information, product and pricing information, etc. The real-time traffic database 66 can store traffic information, road and lane closures information, and accident information, etc. for various road segments collected using satellite imagery or updates from drivers, for example. The real-time traffic database 66 in some implementations also stores various information related to public transportation such as delays and cancellations, indications of how busy certain public transportation routes are, and expected arrival times.

The server 60 can include one or more processors and computer-readable memory storing instructions that implement a navigation directions engine 68. In an example scenario, the navigation directions engine 68 receives a request for navigation directions from the client device 12, generates a route between the specified source and destination for a specified or automatically determined mode of transport, and generates navigation directions for the route. Example operation of the navigation directions engine 68 and the navigation directions module 44 operating in the user device 12 are discussed below.

Retrieving and Displaying Navigation Directions

Figure 2:
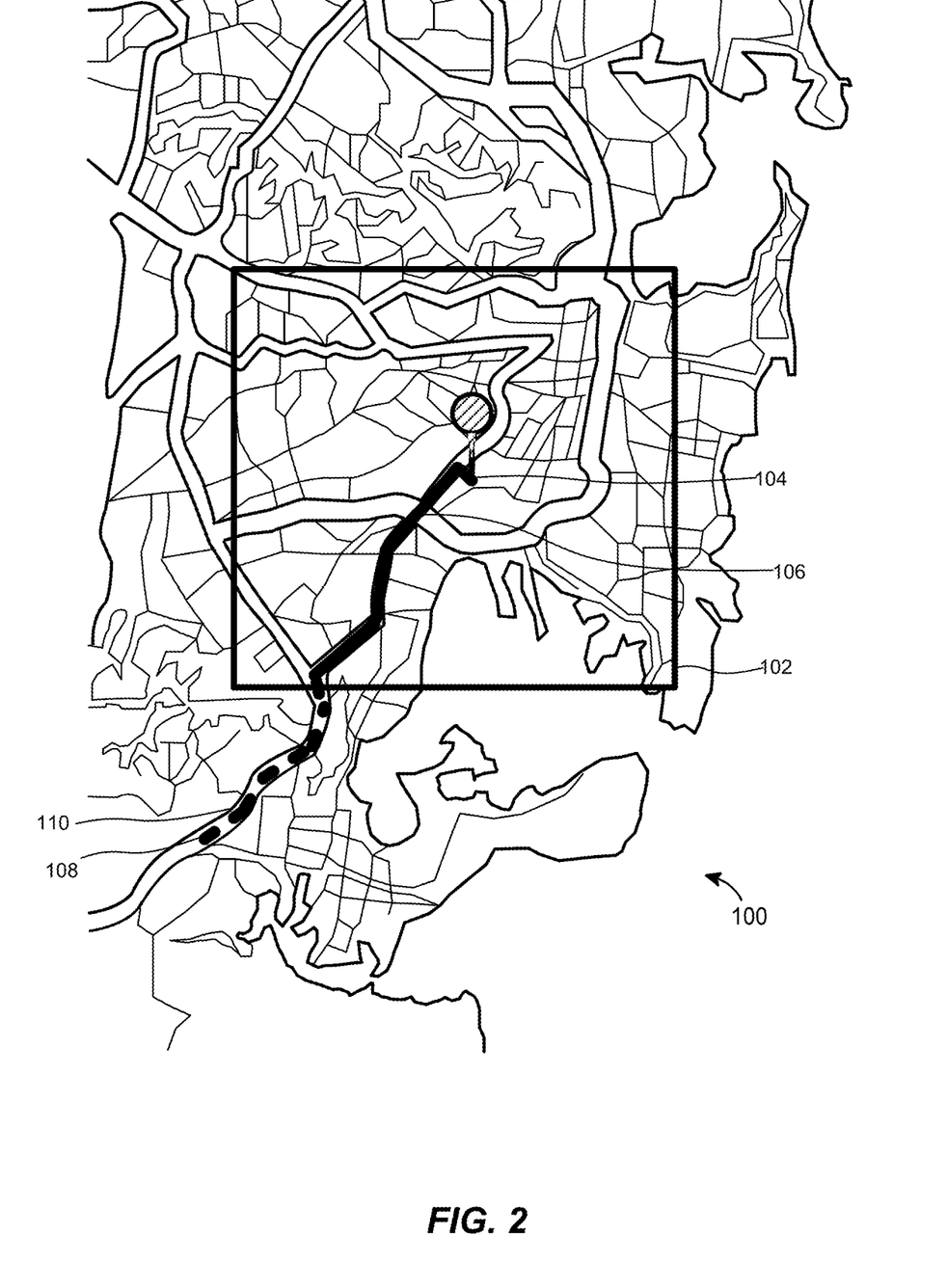
FIGS. 2 and 3 illustrate example navigation directions in a map viewport positioned over different geographic areas, which can be generated by the system of FIG. 1.

FIG. 2 illustrates an example interactive digital map 100 which the navigation directions module 44 can display, with a viewport 102 defining the portion currently visible to the user.

In an example implementation, the user interface 22 of the user device 12 includes a screen, and the viewport 102 corresponds to the active portion of the screen. The navigation directions module 44 repositions the viewport 102 in response to user commands received via the user interface 22 and displays the appropriate portion of the digital map 100 within the viewport 102. Accordingly, different portions of the digital map 100 are visible within the viewport 102 for different positions of the viewport 102. User commands can include typed input, gestures, voice commands, etc. The gestures can involve contact between the user's finger or several fingers and the touchscreen and can include, for example, tap, double tap, drag, fling (or flick), etc. It is also contemplated that the gestures can include three-dimensional hand gestures which the client device 12 can detect using various sensors.

As illustrated in FIG. 2, the navigation directions module 44 provides navigation directions as a graphic overlay 106 on the digital map 100. The navigation directions module 44 in this example scenario determines a geometric center of the region of the digital map 100 covered by the viewport 102 in its current position, identifies the nearest routable segment, which may be a point, and selects the identified nearest routable segment as the destination 104 for navigation directions. Regarding the origin 108 of the navigation directions, the navigation directions module 44 can select for this purpose the current location of the user device 12, an explicitly designated location, the user's home or work address, a location on the edge of the viewport corresponding to a major access road, or any other suitable location. The navigation directions module 44 generates navigation directions from the origin 108 to the destination 104 by querying the server 60 or using the cached map data 46. As discussed in more detail below, the navigation directions module 44 can request navigation directions at varying level of detail.

The graphic overlay 106 in this example is a series of highlighted road segments. FIG. 2 also depicts a path 110 between the origin 108 and the edge of the viewport 102. However, it will be understood that the path 110 is not visible when the viewport 102 is positioned as illustrated in FIG. 2, and that the path 110 is shown for clarity only.

Figure 3:
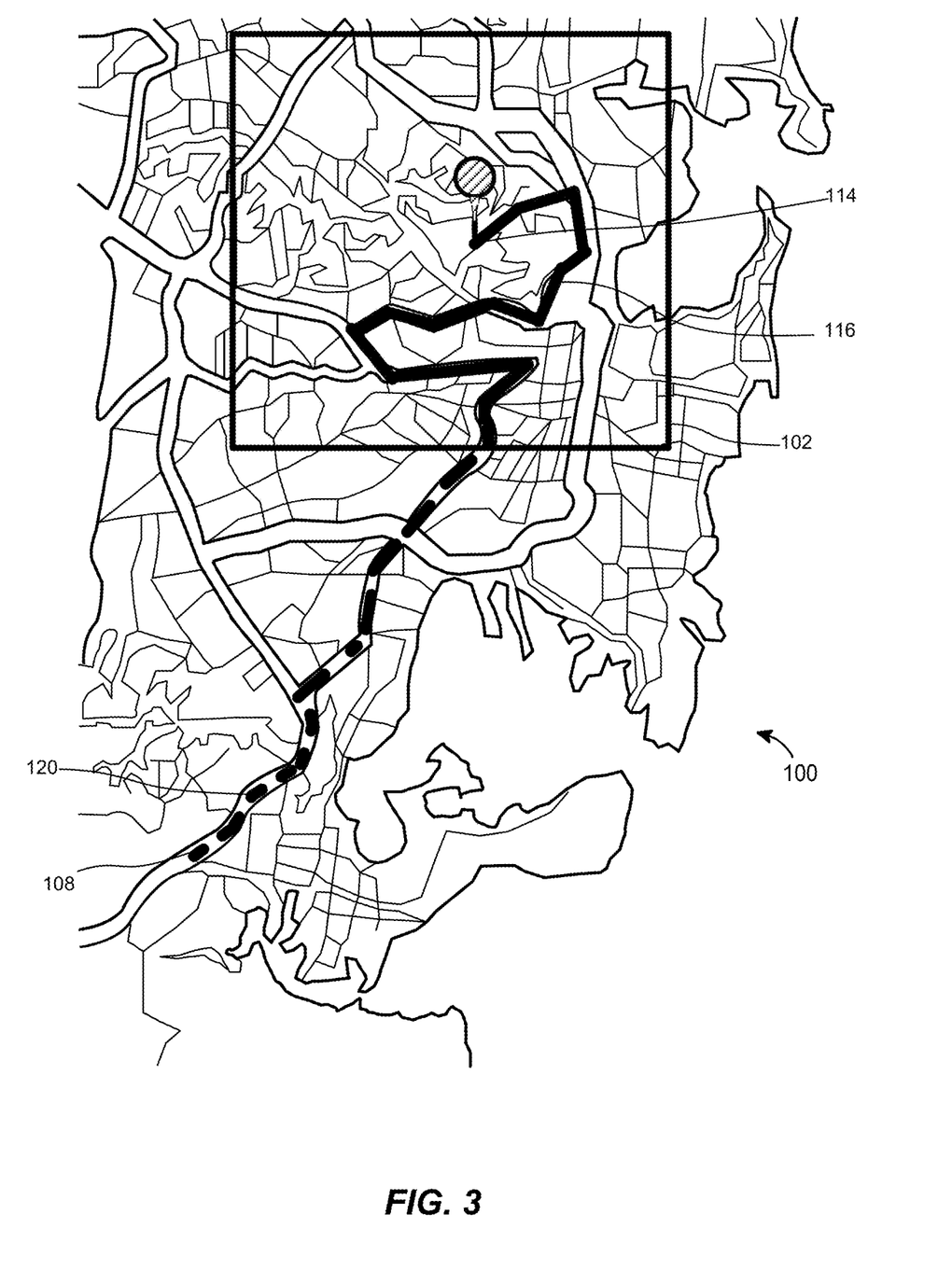

Now referring to FIG. 3, the user can reposition the viewport 102 relative to the digital map by dragging the viewport 102 using a certain figure gesture, for example. The navigation directions module 44 automatically determines the geometric center of the region of the digital map covered by the viewport 102 in its new position, identifies the new nearest routable segment, and selects the identified nearest routable segment as the new destination 114 for navigation directions. Then, the navigation directions 44 requests navigation directions 116 to the destination 114. The navigation directions module 44 does so without receiving an explicit command from the user requesting navigation directions. Similar to FIG. 2, for clarity FIG. 3 depicts a path 120 between the origin 108 and the edge of the viewport 102.

According to one example implementation, the navigation directions module 44 illustrates a new destination within the viewport 102 and obtains new navigation directions only after determining that the viewport 102 has been displaced my minimum distance $d_{min}$. For example, the navigation directions module 44 can determine whether the distance between the destinations 114 and 104 is greater than $d_{min}$ and obtain new navigation directions only in response to determining that the distance exceeds $d_{min}$; otherwise, if the distance does not exceed $d_{min}$, the navigation directions module 44 does not obtain new navigation directions to preserve bandwidth and processing resources. In various implementations, the distance between points on the digital map can be measured as the crow flies, along the available roads, in terms of screen pixels, etc.

The value of $d_{min}$ can be dependent on the zoom level. For example, when the viewport 102 illustrates a geographic area approximately two miles long and two miles wide, $d_{min}$ can be 0.1, 0.2, 0.5, etc. of a mile; when the viewport 102 illustrates a geographic area approximately twenty miles long and twenty miles wide, $d_{min}$ can be 1, 2, 5, etc. miles. In general, $d_{min}$ can be configured to be any suitable value, including a value supplied by a user, in some implementations. The user in an example scenario pans the viewport 102 in a certain direction, and the navigation directions module 44 retrieves navigation directions to locations near the center of the navigation directions module 44 that spaced apart by approximately $d_{min}$, thereby reducing the amount of network traffic and/or the number of memory read operations.

Additionally or alternatively, the navigation directions module 44 determines a new destination and obtains new navigation directions after a certain minimum time interval $t_{min}$ (e.g., 10, 20, 100 msec.) to preserve network bandwidth and/or local processing resources. For example, after the viewport 102 is repositioned as illustrated in FIG. 3, the navigation directions module 44 can delay the retrieval of navigation directions by $t_{min}$.

Further, as the viewport 102 moves from the initial position of FIG. 2 to the target position of FIG. 3, the navigation directions module 44 can determine the speed at which the viewport 102 is moving across the map. The speed in one example implementation is measured in terms of screen pixels per second or another unit of time, regardless of the zoom level at which the digital map is being viewed. In another example implementation, the speed is measured in terms of miles or kilometers by which the geographic area represented by the digital map is displaced per second. The speed in this case is dependent on the zoom level of the digital map. In yet another implementation, the speed is measured in terms of miles or kilometers "traveled" along the navigation route between the origin and the destination, which is re-calculated continuously or periodically as the viewport 102 is moving. More generally, the speed of the viewport 12 can be measured in any suitable manner.

The navigation directions module 44 can use the measured speed of the viewport 12 to determine how often the new destination should be recalculated, how often new navigation directions should be obtained, at which level of detail the navigation directions should be retrieved, etc. The navigation directions module 44 can obtain navigation directions at a low level of detail upon determining that the speed exceeds a certain threshold speed $v_{min}$. Conversely, navigation directions module 44 can obtain navigation directions at a high level of detail upon determining that the speed does not the threshold speed $v_{min}$.

In various implementations, the navigation directions module 44 uses one or more of the distance threshold $d_{min}$, the time threshold $d_{min}$, or a speed threshold $v_{min}$ to determine whether new navigation directions should be obtained and, if so, what level of detail should be appropriate. As one example of using multiple factors to determine how navigation directions should be obtained, the navigation directions module 44 can require that the viewport 102 be displaced by at least $d_{min}$ or that the viewport 102 remain at the new location for at $d_{min}$ and obtain new navigation directions only if one of these two conditions is satisfied.

The level of detail at which the navigation directions module 44 can obtain navigation directions can correspond to two, three, or any suitable number of modes. More particularly, the navigation directions module 44 in some embodiments can request one of two levels of detail, low and high, for the navigation directions, and in other embodiments can request one of three or more levels of detail (e.g., low, medium, high). In an example implementation, the low level of detail corresponds to lightweight navigation directions that include a polyline describing the path, for applying as an overlay to the digital map. The high level of detail corresponds to detailed navigation directions that include turn-by-turn instructions (e.g., "stay on route 12 for five miles," "make a left onto Elm St.," "take exit 174"), lane information (e.g., an HOV lane on a certain route segment, three lanes in another route segment, left-only lane at a certain intersection), real-time traffic information (amount of traffic, accident and lane closure information, etc.), information about points of interest (POIs) along the route and/or at the destination, photographs of objects such as landmarks at waypoints along the route and selective street-level imagery.

To select the appropriate mode(s) of transport for traveling to the destination, the navigation directions module 44 can consider such user-specific signals as explicit and/or implied preferences, recently used modes of transport, etc., as well as the distance between the source 108 and the destination 104/114 and other signals related to the destination. In an example scenario, the navigation directions module 44 automatically obtains walking directions when the distance between the source and the destination is less than a certain distance $d_1$, driving directions when the distance between the source 108 and the destination 104 is greater than distance $d_1$ but less than a certain distance $d_2$, etc. In some implementations, lightweight navigation directions include only those for a single mode of transport, and detailed directions include navigation directions according to one or more alternative modes of transport, so that if the user switches between modes of transport when interacting with the digital map, the transition appears seamless. As discussed below with reference to FIG. 5, automatically obtained navigation directions also can be multi-modal.

In the examples discussed above, the navigation directions module 44 can identify the destination and determine various parameters for obtaining navigation direction, such as the timing for generating a request to a network server (or a local request that involves cached map data) or the level of detail for the request navigation directions. Some of these decisions alternatively can be implemented in the server 60, at least where the request for navigation directions pertains to server 60. For example, the navigation directions module 44 can specify the direction and the speed at which the viewport is moving at a particular time, and the server 60 can automatically determine the appropriate parameters for the navigation directions. In general, the functionality of automatically retrieving navigation directions can be distributed between the navigation directions module 44 and the navigation directions engine 68 of the server 60 in any suitable manner.

Figure 4:
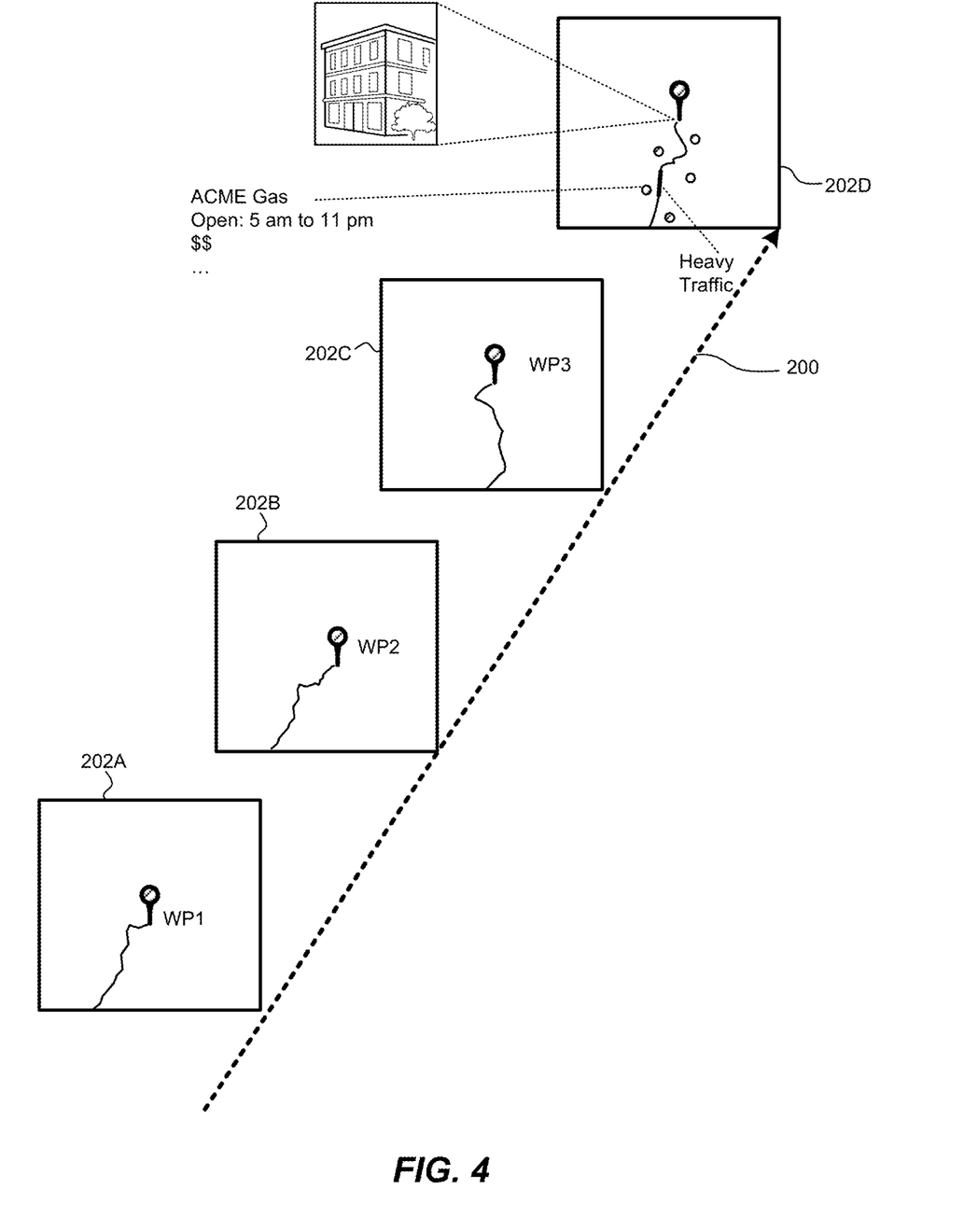
FIG. 4 is a diagram of navigation directions at different levels of detail, retrieved for different positions of a map viewport along a certain trajectory by the system of FIG. 1.

Now referring to FIG. 4, the user can communicate motion to the viewport 102 with a fling gesture, for example, so that the viewport 102 continues movement along an expected trajectory 200 from its current position 202A toward its final position 202D after the user discontinues contact with the screen. For example, the geographic application 42 can detect contact with the touchscreen via which the digital map is being displayed and measure the direction in which the user flings the viewport 102 as well as the acceleration of the gesture. Using these measurements, the geographic application 42 can determine the expected trajectory of the viewport 102 between the initial, current position and a target position. The viewport 102 ultimately may not follow the expected trajectory if, for example, the user applies a new gesture before the viewport 102 reaches its target position, thereby overriding the previous user command. In any case, upon calculating the expected trajectory and before advancing the viewport to the positions 202A-D, the geographic application 42 can automatically obtain navigation directions to waypoints associated with these positions.

FIG. 4 illustrates the viewport 102 at its final position 202D as well as several intermediate positions 202A-C. In one implementation, the intermediate positions 202A-C are spaced along the trajectory 200 with a certain fixed separation distanced d. Similar to the examples discussed above, distance d can be specific to the zoom level of the digital map visible in viewport 102. Distance d can be measured as the crow flies or along the roads in view of the mode of transport, depending on the implementation. The navigation directions module 44 in general can determine intervals between points around which the viewport 102 centers at positions 202A-C in view of distances calculated in any suitable manner, travel times between the corresponding centers of the viewport, or a fixed number of intermediate positions associated with a fling gesture (if the navigation directions module 44 calculates N intermediate positions of the viewport for every fling gesture, irrespective of the acceleration communicated to the viewport or the zoom level of the digital map).

Further, the navigation directions module 44 can select the intermediate positions of the viewport 102 in view of the speed at which the viewport 102 moves relative to the underlying digital map. The speed generally changes in response to a fling gesture: the viewport first accelerates, reaches its maximum speed, and decelerates down to a stop when reaching the end of the trajectory. Thus, when the viewport is moving at the speed of 10 km/sec relative to the geography represented in the map, the navigation directions module 44 can select intermediate positions of the viewport with centers 1 km apart, and when the viewport is moving at the speed of 5 km/sec relative to the geography represented in the map, the navigation directions module 44 can select intermediate positions of the viewport with centers 500 m apart.

Using another approach, the intermediate positions 202A-C are selected in view of the points of interest available in the viewport 102 along the trajectory 200. Some of these points of interest can serve as waypoints for navigation directions, and the viewport 102 in some embodiments is centered around these waypoints rather than points directly on the trajectory 200, with the navigation directions extending approximately to the geometric center of the viewport; or the viewport 102 can be centered around points directly on the trajectory 200, with the navigation directions extending to the waypoints visible in the viewport, regardless of whether these waypoints are close to the center to the viewport. The navigation directions module 44 can select points of interest in view of user preferences, recently visited places, the user's social graph (e.g., places the user's friends liked), etc. The user in some implementations provides an indication that the navigation directions module 44 can use these signals in identifying s POIs, by operating certain controls or installing software, for example. In the example of FIG. 4, each of the waypoints WP1, WP2, and WP3 can correspond to a geographic location which is likely to be of particular interest to the user.

The navigation directions module 44 can obtain navigation directions at a first level of detail for the intermediate viewport positions 202A-C and at a second level of detail for the final position 202D. In particular, the navigation directions module 44 can obtain lightweight navigation directions for the positions 202A-C, as the viewport 102 is expected to move over these positions quickly, and detailed navigation directions for the position 202D, where the user is likely to view the map for some time. Different levels of detail can be selected as discussed above with reference to FIG. 3. FIG. 4 illustrates an example implementation in which the viewport at position 202D includes, in addition to the polyline extending to the destination, a street-level image of the destination location, points of interest along the polyline visible in the viewport, and business hours, prices, etc. for businesses included in the points of interest. Further, the polyline in the viewport at position 202D includes sections that are rendered using a different color, line thickness, or another rendering parameter to indicate heavy traffic. Similar to the polyline, the points of interest can be illustrated on the digital map as overlays. Regarding business data, these details can be provided in the form of windows displayed next to or below the digital map, for example.

In a further implementation the distance d between each two successive positions 202A-D along the trajectory may be selected in view of a determined latency associated with retrieving the navigation directions. For example, the distance d may be selected in view of the determined latency so that navigation directions to a position on the trajectory are available for display in the viewport by the time the viewport reaches that position. In an implementation, the navigation directions module 44 can select the distance d to be greater for a higher determined latency and smaller for a lower determined latency. In the case of a portable device that communicates with a remote network server over a wireless communications network (e.g., the client device 12 communicating with the server 60), the latency may for example be determined based on the interval between the time at which the portable device sends a request for navigation directions to a position and the time of receipt at the mobile device of a response from the remote server, or based on the interval between the time at which the portable device sends a request for navigation directions to a position and the time of completion of rendering the navigation directions in the viewport of the portable device. Corresponding methods may be used to determine latency in a case where a device retrieves navigation directions stored in memory regions of the device.

As discussed above, the navigation directions module 44 displays navigation directions to a certain location illustrated in the viewport without receiving an explicit request for these navigation directions from a user. To select this location for a given position of the viewport, the navigation directions module 44 in some implementations determines the routable segment nearest to the geometric center of the viewport for a certain single mode of transport. More specifically, the navigation directions module 44 identifies a geographic entity such as a street address, a landmark, a set of coordinates, a geographic place encompassing a certain area, etc. reachable by the mode of transport, and illustrates navigation directions to this entity even if its location does not precisely align with the geometric center of the viewport.

As one example, the navigation directions module 44 determines that the user is most likely interested in public transport directions (rather than driving, bicycling, etc.) and determines which station or stop serviced by a public transport system is near the geometric center of the viewport. Starting with a circular search area centered at the geometric center and having a certain initial radius, which may dependent on the zoom level of the digital map, the navigation directions module 44 can iteratively increase the radius until a suitable station or stop of the public transport system is within the search area.

In some cases, the navigation directions module 44 can generate multi-modal navigation directions made up of portions corresponding to different types of transport. For example, navigation directions can include driving directions followed by walking directions. The navigation directions module 44 can retrieve driving directions to the nearest routable segment accessible by car, and then retrieve walking directions from this segment to the geometric center of the viewport, or a location accessible on foot that is proximate to the geometric center of the viewport. As a more specific example, the viewport may be positioned over a park with an adjacent parking lot. The navigation directions module 44 can retrieve driving directions to the parking lot and then retrieve walking directions from the parking lot to the center of the park.

Figure 5:
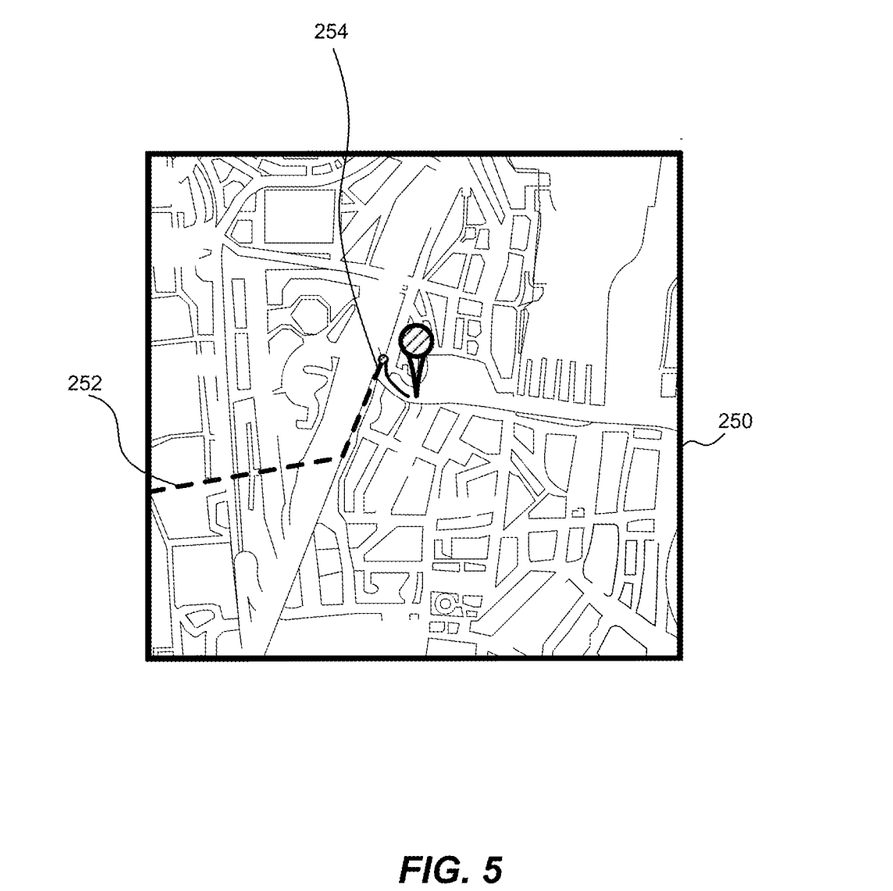
FIG. 5 illustrates example multi-mode navigation directions which the system of FIG. 1 can generate for a certain position of the map viewport.

FIG. 5 illustrates example an example viewport 250 with lightweight driving directions 252 followed by walking directions 254. The navigation directions module 44 can illustrate the polyline corresponding to the driving directions 252 differently than the polyline corresponding to the walking directions 254. For example, the navigation directions module 44 can use different colors, patterns, thicknesses, etc.

It is noted that although the various for retrieving obtaining navigation directions are discussed above primarily with reference to the navigation directions module 44, at least some of the techniques alternatively or additionally can be implemented in the navigation directions engine 68 operating in the server system 60. For example, the navigation directions module 44 according to some implementations reports the current position of the viewport and user commands such as gestures to the navigation directions engine 68, which in response determines positions of the viewport for which navigation directions should be automatically retrieved without an explicit request from the user, for which locations within the viewport navigation directions should be retrieved, at what level of detail the navigation directions should be retrieved, etc. In another implementation, the navigation directions module 44 can determine one or more positions of the viewport (relative to a digital map) for which navigation directions should be provided via the user interface, and the navigation directions engine 68 determines specific locations in the viewport at these positions of the viewport as well as the appropriate level of detail for the navigation directions. The navigation directions engine 68 in these implementations can use the more robust data available to the server system 60 to select locations within the viewport. For example, for a certain position of the viewport, the navigation directions engine 68 can determine which locations proximate to the geometric center of the viewport are frequently visited by users or specifically by those users who are a part of the social graph of the user operating the client device 12.

For further clarity, several example methods that can be implemented in the navigation directions module 44 and/or the navigation directions engine 68 are discussed next with reference to FIGS. 6-8. Each of these methods can be implemented as a set of instructions stored on a computer-readable medium and executable on one or more processors.

Figure 6:
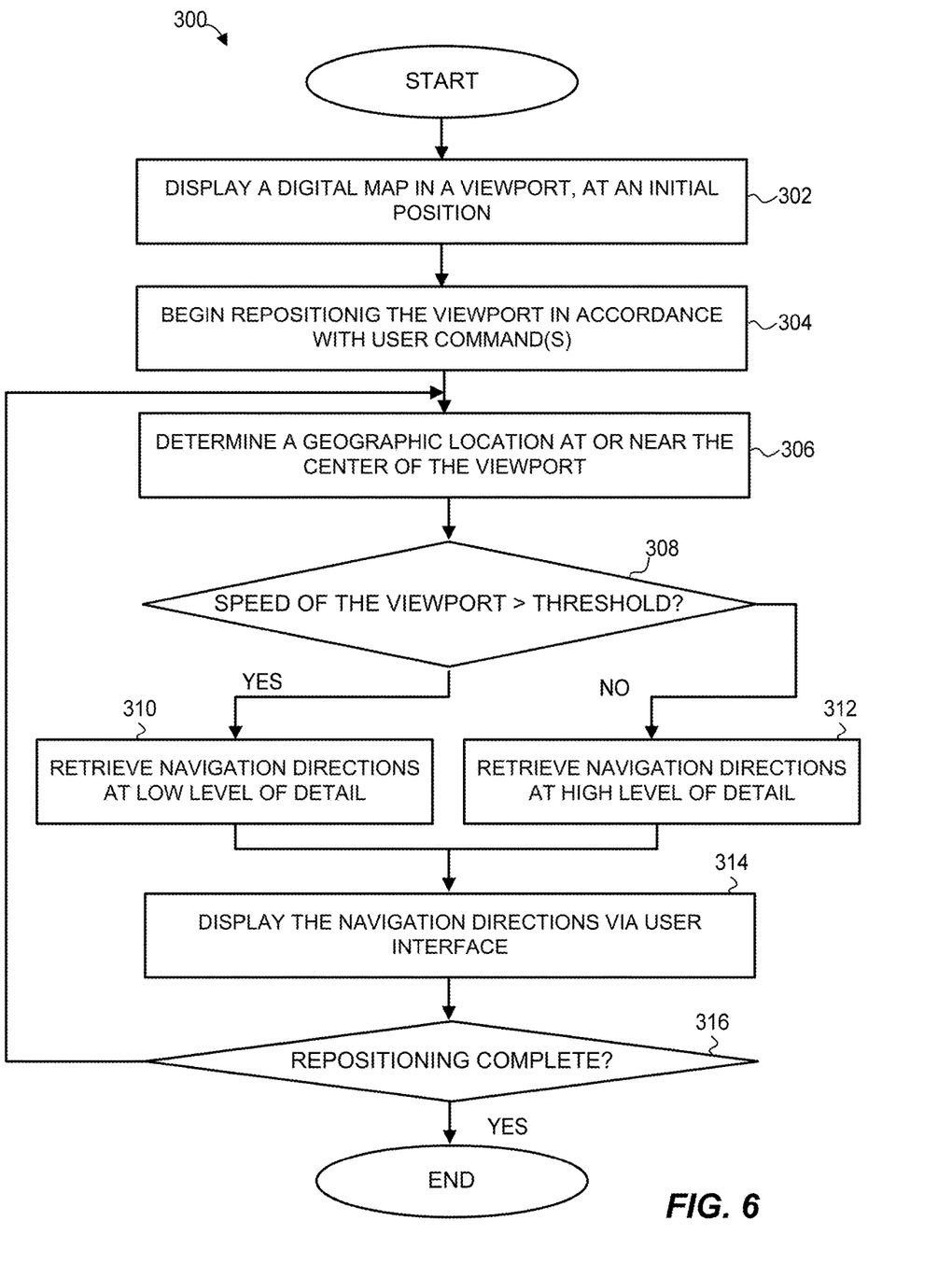
FIG. 6 is a flow diagram of an example method for retrieving navigation directions at different levels of detail in accordance with the current speed of the map viewport, which can be generated in the system of FIG. 1.

FIG. 6 is a flow diagram of an example method 300 for retrieving navigation directions at different levels of detail in accordance with the current speed of the map viewport. The method 300 begins at block 302, where a digital map is displayed within a viewport at its initial position. The geographic application can place the viewport at its initial position in response to a geographic search query (e.g., "San Francisco, Calif." or "pharmacies near me"), an explicit gesture-based, typed, or spoken user command, a command received from a website in which a digital map is embedded, etc.

At block 304, the geographic application begins to reposition the viewport in accordance with a user command or a sequence of commands. For example, the user can begin to drag the viewport by placing her finger on the touchscreen and moving the finger in a certain direction while maintaining contact with the touchscreen, or the user flings the viewport in a certain direction and with a certain acceleration.

Next, the geographic location at or near the center of the viewport is determined at block at 306. The geographic application can determine the geometric center of the viewport and a nearby routable segment, for example. The current speed of the viewport then is compared to a threshold value at block 308. If the speed is above the threshold, the flow proceeds to block 310, where navigation directions are retrieved at a low level of detail from a network server or locally using cached data. If the speed is not above the threshold, the flow proceeds to block 312, where navigation directions are retrieved from a network server at a high level of detail. In some cases, the geographic application may be able to retrieve some of the high-level details using cached data in the memory of the client device, but in general such information as real-time traffic data are available at a network server but are unavailable locally.

After block 310 or 312 is executed, the flow proceeds to block 314, where the navigation directions are displayed via a user interface. The display of navigation directions can include a polyline overlaid on a digital map and, depending on the level of detail, turn-by-turn instructions in the form of text, speech, images, etc. As discussed above, detailed navigation directions also can include street-level imagery for various locations.

If it is determined at block 316 that the repositioning of the viewport is complete, the method ends. Otherwise, the viewport is further repositioned and the flow returns to block 306.

Figure 7:
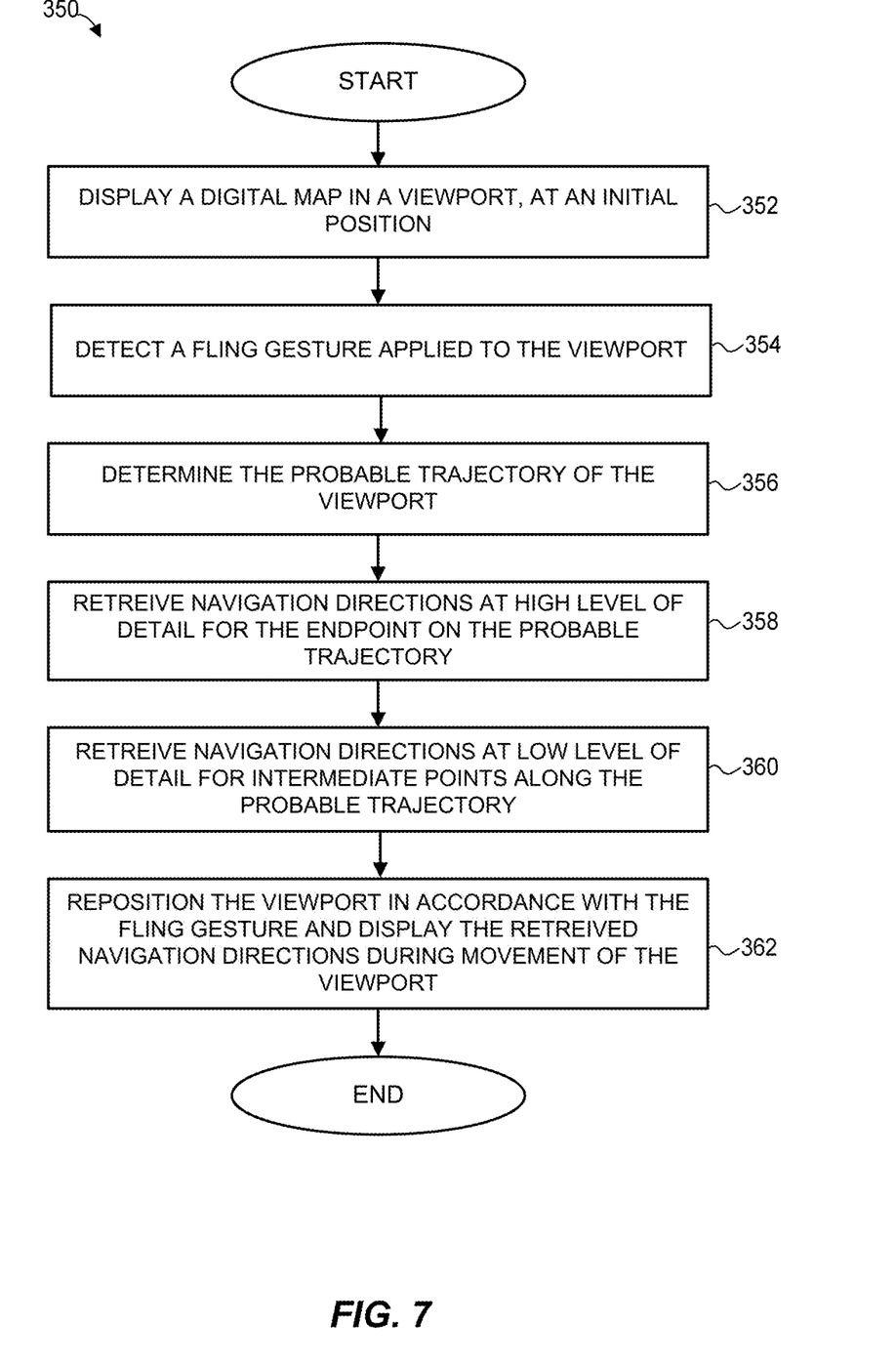
FIG. 7 is a flow diagram of an example method for retrieving navigation directions at different levels of detail for different points along the expected trajectory of the map viewport, which can be generated in the system of FIG. 1.

Now referring to FIG. 7, an example method 350 is for retrieving navigation directions at different levels of detail for different points along the expected trajectory of the map viewport. The method begins at block 352, where a digital map is displayed in a viewport at an initial position. Application of a fling gesture to the viewport is detected at block 354. The fling gesture communicates a certain acceleration in a certain direction to the viewport. The acceleration and the direction can be ascertained immediately after the gesture completes, e.g., after the user lifts his or her fingers off the surface of the touchscreen.

A probable trajectory of the viewport is determined at block 356. The probable trajectory includes a target position at which the viewport is expected to come to rest and a set of intermediate positions the viewport is expected to pass on the way to the target position, absent further user interaction with the viewport. The geographic application can determine the probable trajectory before repositioning the viewport or when repositioning begins, but in any case before the viewport reaches the destination. Navigation directions for some of the positions of the viewport can be retrieved at blocks 358 and 360 at a high and low levels of detail, respectively. In this example implementation, detailed navigation directions are retrieved for the endpoint of the viewport at block 358, and lightweight navigation directions are retrieved for the intermediate positions of the viewport at block 360. The viewport is then repositioned in accordance with the fling gesture at block 362.

For example, in accordance with the method 350, the geographic application can determine the user discontinued contact with the touchscreen, determine the probable trajectory, retrieve the navigation directions for the endpoint and the intermediate positions at the corresponding levels of detail (or at least send out a request for these navigation directions, at discussed below), and then begin to reposition the viewport. In this manner, the geographic application either has the data required for displaying navigation directions to a certain location by the time the viewport reaches the location, or is about to receive this data in response to an already-submitted request by the time the viewport reaches the location.

In some implementations and/or scenarios, not all of the navigation directions are fully retrieved by the time the viewport starts to move. For example, referring back to FIG. 1, to retrieve the navigation directions, the geographic application 42 can transmit corresponding requests to the server system 60. The geographic application 42 may not receive all the responses by the time geographic application 42 begins to repositions the viewport, but if data arrives from the server system 60 for the intermediate positions the viewport reaches first prior to rendering the map data for the viewport, the geographic application 42 provides the navigation directions seamlessly. As a more particular example, the geographic application 42 may send to the server system 60 requests $R_1, R_2, R_3, \ldots R_N$ for navigation directions to locations $L_1, L_2, L_3, \ldots L_N$, respectively, in the order in which the viewport is expected to reach the locations $L_1, L_2, L_3, \ldots L_N$. By the time the viewport reaches location $L_1$, the geographic application 42 may have received responses corresponding to the requests $R_1$ and $R_2$ but not $R_3$ to $R_N$; then, by the time the viewport reaches location $L_2$, the geographic application 42 may have received several additional responses corresponding to the requests $R_3$ to $R_5$; etc. The geographic application 42 thus can provide seamless experience to the user by displaying the already-available navigation directions for the new positions of the viewport. More generally, the responses to the requests $R_1, R_2, R_3, \ldots R_N$ can arrive at any time depending on network conditions and implementation details, but in any case the requests $R_1, R_2, R_3, \ldots R_N$ are sent out before the viewport reaches the corresponding locations, and the geographic application 42 thus reduces the delay.

Figure 8:
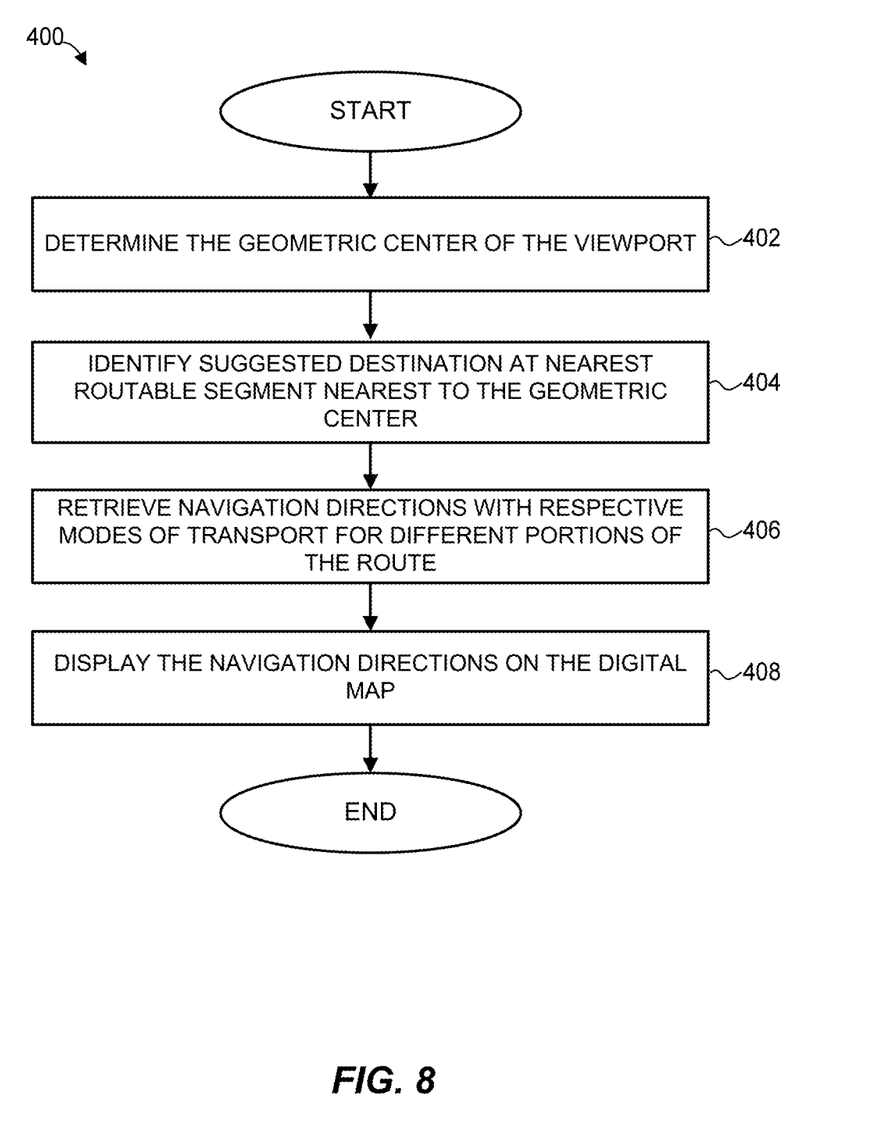
FIG. 8 is a flow diagram of an example method for generating multi-modal navigation directions, which can be generated in the system of FIG. 1.

Next, FIG. 8 illustrates a flow diagram of an example method 400 for generating multi-modal navigation directions. At block 402, the geometric center of the viewport is determined. Next, a suggested destination at the routable segment nearest to the geometric center of the viewport is identified (block 404). At block 406, multi-modal navigation directions are retrieved from a network server or local memory storing cached map data. The multi-modal navigation directions can include several portions, with navigation directions for each portion corresponding to a different mode of transport. The mode of transport for each portion can be selected in view of such factors as distance (e.g., flying for distances exceeding the first threshold, driving for distances below the first threshold and exceeding the second threshold), user preferences, the last mode of transport selected by the user, etc. At block 408, the multi-modal navigation directions are displayed on the digital map.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of various embodiments. This description should be read to include one or at least one and the singular also includes the plural unless it is obvious that it is meant otherwise.

Upon reading this disclosure, those of ordinary skill in the art will appreciate still additional alternative structural and functional designs for retrieving navigation directions through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for providing navigation directions, the method comprising:
   providing an interactive digital map of a geographic area via a user interface of a user device, including displaying a currently visible portion of the interactive digital map within a viewport;
   repositioning the viewport from an initial position on the digital map to a target position on the digital map along a trajectory in accordance with one or more user commands;
   for a plurality of different viewports displaying different positions on the trajectory at different times, automatically retrieving the navigation directions to a geographic location near a center of each of the plurality of different viewports without receiving commands via the user interface to obtain the navigation directions to the geographic location, including:
   retrieving navigation directions having a first level of detail for a first position on the trajectory, and
   retrieving navigation directions having a second level of detail for a second position on the trajectory, the first level of detail including less information than the second level of detail; and
   displaying the navigation directions via the user interface.

2. The computer-implemented method of claim 1, wherein retrieving the navigation directions having the first level of detail includes determining that a speed at which the viewport moves at the first position exceeds a threshold value, and retrieving the navigation directions having the second level of detail includes determining that a speed at which the viewport moves at the second position does not exceed the threshold value.

3. The computer-implemented method of claim 1, comprising:
   detecting the user command applied to the viewport; and
   wherein automatically retrieving the navigation directions includes:
   prior to repositioning the viewport in accordance with the user command, determining a probable trajectory of the viewport, the probable trajectory including a plurality of intermediate positions between the initial position and the target position, and
   retrieving navigation directions having the first level of detail for one of the plurality of intermediate positions on the probable trajectory, and retrieving navigation directions having the second level of detail for the target position.

4. The computer-implemented method of claim 3, wherein detecting the user command applied to the viewport includes detecting a fling gesture which communicates a certain acceleration in a certain direction.

5. The computer-implemented method of claim 1, comprising:
retrieving navigation directions to the first position before the viewport is repositioned to the first position, and
retrieving navigation directions to the second position before the viewport is repositioned to the second position.

6. The computer-implemented method of claim 1, wherein the plurality of different positions on the trajectory, for which the navigation directions are retrieved, are spaced apart by a distance d.

7. The computer-implemented method of claim 6, further comprising:
determining latency associated with retrieving the navigation directions, and
adjusting the distance din view of the determined latency.

8. The computer-implemented method of claim 1, wherein:
retrieving the navigation directions having the first level of detail includes obtaining a polyline corresponding to a path defined by the navigation directions, and
retrieving the navigation directions having the second level of detail includes obtaining the polyline along with at least one of (i) turn-by-turn instructions, (ii) real-time traffic data, (iii) street-level imagery for one or more points along the path, or (iv) place page information for one or more locations along the path, wherein retrieving the first level of detail navigation directions includes not receiving any of data (i)-(iv).

9. The computer-implemented method of claim 1, wherein automatically retrieving the navigation directions to the geographic location near the center of each of the plurality of different viewports includes:
for at least one of the plurality of different viewports, determining the center of the viewport,
identifying a station of a public transportation system proximate to the determined center of the viewport, and
automatically retrieving public transport directions to the identified station.

10. The computer-implemented method of claim 9, wherein identifying the station proximate to the determined geographic location includes iteratively increasing a search radius from the center of the viewport.

11. The computer-implemented method of claim 1, wherein retrieving the navigation directions includes:
sending a request to a remote network server via a communication network, and
receiving the navigation directions from the remote network server via the communication network.

12. The computer-implemented method of claim 1, wherein retrieving the navigation directions includes using cached map data stored in a local memory.

13. The computer-implemented method of claim 1, wherein automatically retrieving the navigation directions includes automatically selecting a mode of transport based on prior interactions between a user operating the user interface and the digital map.

14. A non-transitory computer-readable medium storing instructions that, when executed, cause one or more processors to:
provide an interactive digital map of a geographic area via a user interface of a user device, including displaying a currently visible portion of the interactive digital map within a viewport;
reposition the viewport from an initial position on the digital map to a target position on the digital map along a trajectory in accordance with one or more user commands;
for a plurality of different viewports displaying different positions on the trajectory at different times, automatically retrieve navigation directions to a geographic location near a center of each of the plurality of different viewports without receiving commands via the user interface to obtain the navigation directions to the geographic location, including:
retrieve navigation directions having a first level of detail for a first position on the trajectory, and
retrieve navigation directions having a second level of detail for a second position on the trajectory, the first level of detail including less information than the second level of detail; and
display the navigation directions via the user interface.

15. The computer-readable medium of claim 14, wherein to retrieve the navigation directions having the first level of detail, the instructions cause the one or more processors to determine that a speed at which the viewport moves at the first position exceeds a threshold value, and to retrieve the navigation directions having the second level of detail, the instructions cause the one or more processors to determine that a speed at which the viewport moves at the second position does not exceed the threshold value.

16. The computer-readable medium of claim 14, wherein the instructions further cause the one or more processors to:
detect the user command applied to the viewport; and
wherein to automatically retrieve the navigation directions, the instructions cause the one or more processors to:
prior to repositioning the viewport in accordance with the user command, determine a probable trajectory of the viewport, the probable trajectory including a plurality of intermediate positions between the initial position and the target position, and
retrieve navigation directions having the first level of detail for one of the plurality of intermediate positions on the probable trajectory, and retrieve navigation directions having the second level of detail for the target position.

17. A computing device comprising:
one or more processors; and
a non-transitory computer-readable storage medium storing instructions that, when executed, cause the one or more processors to:
provide an interactive digital map of a geographic area via a user interface of the computing device, including displaying a currently visible portion of the interactive digital map within a viewport;
reposition the viewport from an initial position on the digital map to a target position on the digital map along a trajectory in accordance with one or more user commands;

for a plurality of different viewports displaying different positions on the trajectory at different times, automatically retrieve navigation directions to a geographic location near a center of each the plurality of different viewports without receiving commands via the user interface to obtain the navigation directions to the geographic location, including:
  retrieve navigation directions having a first level of detail for a first position on the trajectory, and
  retrieve navigation directions having a second level of detail for a second position on the trajectory, the first level of detail including less information than the second level of detail; and
  display the navigation directions via the user interface.

18. The computing device of claim 17, wherein to retrieve the navigation directions having the first level of detail, the instructions cause the one or more processors to determine that a speed at which the viewport moves at the first position exceeds a threshold value, and to retrieve the navigation directions having the second level of detail, the instructions cause the one or more processors to determine that a speed at which the viewport moves at the second position does not exceed the threshold value.

19. The computing device of claim 17, wherein the instructions further cause the one or more processors to:
  detect the user command applied to the viewport; and
  wherein to automatically retrieve the navigation directions, the instructions cause the one or more processors to:
    prior to repositioning the viewport in accordance with the user command, determine a probable trajectory of the viewport, the probable trajectory including a plurality of intermediate positions between the initial position and the target position, and
    retrieve navigation directions having the first level of detail for one of the plurality of intermediate positions on the probable trajectory, and retrieve navigation directions having the second level of detail for the target position.

20. The computing device of claim 17, wherein the plurality of different positions on the trajectory, for which the navigation directions are retrieved, are spaced apart by a distance d.

* * * * *